United States Patent
Nagafuchi et al.

[15] 3,636,787
[45] Jan. 25, 1972

[54] BELT POWER TRANSMISSION DEVICE

[72] Inventors: Kazumi Nagafuchi; Hitoshi Inada; Nobuaki Ohmura; Seiji Manago, all of Fukuoka; Asaji Tsunashima; Masataka Hazu, both of Tokyo, all of Japan

[73] Assignees: Mitsubishi Electric Corporation; Shinwa Sangyo Company, Tokyo, Japan, part interest to each

[22] Filed: Mar. 11, 1970

[21] Appl. No.: 18,664

[30] Foreign Application Priority Data

Mar. 20, 1969 Japan.................................44/25213
Apr. 30, 1969 Japan.................................44/39515
May 24, 1969 Japan.................................44/40434

[52] U.S. Cl. ............74/242.14 R, 74/242.1 A, 74/242.11 A
[51] Int. Cl. ......................................F16h 7/10, F16h 7/12
[58] Field of Search............74/242.14 R, 242.1 A, 242.11 A, 74/242.11 C, 230.17 B, 242.13 R

[56] References Cited

UNITED STATES PATENTS 2,948,374   8/1960   Husband...................74/242.13 R X
2,638,005   5/1953   King et al..................74/230.17 D
2,762,662   9/1956   Sloyan......................74/242.13 A X
2,874,582   2/1959   Schmitter..................74/230.17 B
3,534,634   10/1970  Kawanami.................74/242.14 R X Primary Examiner—Leonard H. Gerin
Attorney—Oblon, Fisher & Spivak

[57] ABSTRACT

A belt power transmission device in which two intermediate pulleys, each being engaged through a different belt with another pulley, are mounted in spaced relation on opposite ends of a pulley shaft rotatably journaled in a supporting frame is provided with an apparatus for simultaneously adjusting the tension in both belts. The supporting frame is suspended from a casing support structure and is movable relative thereto along a given line, being normally urged in one direction along the line of relative movement by a spring-biasing means disposed therebetween for tensioning the belts, and the adjustment of the tension in the belts supported by the frame is made by varying the tension in the spring-biasing means and thereby causing the frame to be displaced from its original position in relation to the casing.

6 Claims, 6 Drawing Figures

INVENTORS
KAZUMI NAGAFUCHI
HITOSHI INADA
NOBUAKI OHMURA
SEIJI MANAGO
ASAJI TSUNASHIMA
MASATAKA HAZU

BY Oblon, Fisher & Spivak

ATTORNEYS

BELT POWER TRANSMISSION DEVICE

BACKGROUND OF THE INVENTION

The present invention relates generally to belt power transmission devices and more particularly to an improved mechanism for adjusting the tension of belts in power transmission devices of this character.

Heretofore, adjustments of the tension in belts of power transmission devices of the type employing the same have been made by loosening the connection of one of the pulleys carrying the belt from its main support and manually adjusting its position thereon to move it either farther away or nearer to the other pulley with which it is associated. Adjustments are successfully made in this manner but the method nevertheless is not altogether satisfactory. Difficulty is often encountered, for example, in reaching the pulley, which may be located in an almost inaccessible position. Also, the pulley connection must not only be loosened, but retightened upon being displaced, before the tension in the belt may be accurately tested. As a result, several attempts are usually required before the optimum tensioning is achieved.

SUMMARY OF THE INVENTION

Accordingly, it is an object of the present invention to provide a belt power transmission device in which the tension of a belt may be easily and quickly adjusted without loosening a pulley from its support in the usual manner.

Another object of the present invention is to provide an apparatus for simultaneously adjusting the tensions of both input and output belts in a belt power transmission device.

Still another object of this invention is to provide a new and improved belt power transmission device in which the tensions of a belt are automatically adjusted when the tension thereof is decreased.

The foregoing and other objects are attained with the present invention, in one embodiment thereof, by rotatably mounting a pulley-carrying shaft in a frame which, in turn, is readily displaceable relative to a main support, to which the other pulleys are connected. The frame is suspended from the support and is movably connected therewith by an elongate shaft having one end securably engaged to the frame and the other end being freely movable along an axial line within the support. The shaft is urged in a direction along the axial line carrying the frame away from the support by a coil spring compressed between a flange thereon and a collar keyed within the support and carried by a threaded rod rotatably disposed in the support, whereby the belts carried by the pulleys are automatically maintained under tension even when they normally would expand or otherwise tend to become loose and may be easily and quickly put under decreased or increased tension, as required, simply by rotating, or turning, the threaded rod to decrease or increase the tension of the spring by expanding or compressing the same.

BRIEF DESCRIPTION OF THE DRAWINGS

Other objects features and attendant advantages of this invention will be more readily appreciated as the same becomes better understood from the following detailed description when considered in connection with the accompanying drawings wherein like reference numerals designate like or corresponding parts throughout the several Figures and in which.

DESCRIPTION OF THE ILLUSTRATED EMBODIMENTS

Figure 1:
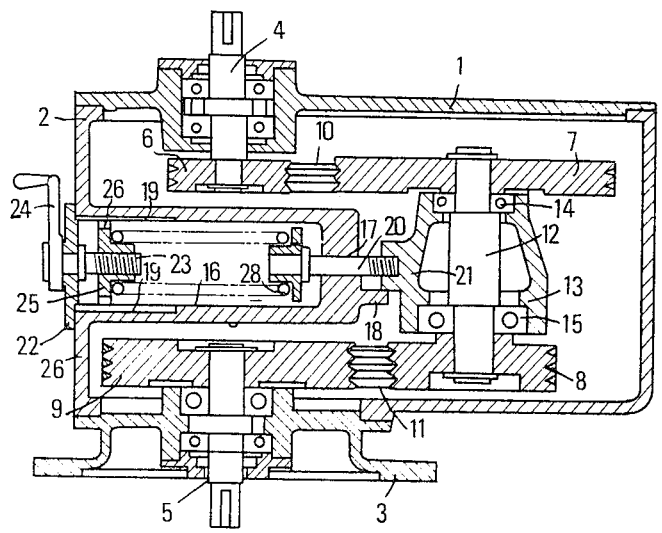
FIG. 1 is a side sectional view of a belt power transmission device constructed in accordance with the teachings of the present invention.
Figure 2:
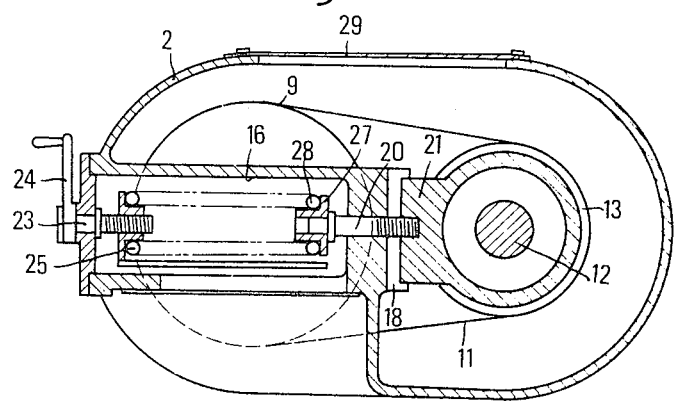
FIG. 2 is a longitudinal sectional view of the device shown in FIG. 1 taken along the line 2—2 therein.

Referring now to the drawings, and more particularly to FIGS. 1 and 2 thereof, which show one embodiment of the belt powered transmission device of this invention, there is shown a bracket 1, a casing or main support structure 2, a fitting flange 3, and input and output shafts 4 and 5, respectively. A pulley 6 is driven by the input shaft 4 and is belted to a pulley 7 through a belt member 10 for driving the same. Similarly, a pulley 8 is drivingly connected to a pulley 9 on the output shaft 5 by a belt member 11. The driving and driven intermediate pulleys 7 and 8, respectively, are mounted on opposite ends of an elongate pulley shaft 12 which is journaled in a cylindrical supporting frame 13 on bearings 14 and 15 disposed inside the ends of the frame.

A cylindrical recess 16 is formed in a portion of the casing 2 and a hole 17 is formed through one end of this casing portion substantially aligned with the axis of the recess 16 and thereby lying in a line substantially perpendicular to the longitudinal axis of the shaft 12, pointing approximately toward the midpoint thereof. A pair of longitudinal, substantially diametrically opposed slots 19 are formed on the inside wall of the casing 2 portion defining the recess 16 on the end thereof opposite the hole 17, the purpose of which will be hereinafter set forth.

A supporting bar 20 is slidably inserted through the hole 17 and is threaded at one end for engaging a screw hole in a projecting portion 21 of the pulley shaft-supporting frame 13. Accordingly, the supporting frame 13 is suspended in cantilever fashion from the recessed portion of the casing 2 by the supporting bar 20 and a projection 18 formed on the outer bottom surface of the recess 16 upon which the frame projection 21 rests. It may be observed in FIG. 1 that the distance between the plane of the pulley 7 and the supporting bar 20 is designated by a reference character $a$, and the distance between the supporting bar 20 and the plane of the other intermediate pulley 8 is designated by the reference character $b$. If the tension of the belt 10 is represented by $T_1$ and the tension of the belt 11 by $T_2$, the supporting bar 20 is set at the point with respect to the supporting frame 13 so that the relationship $T_1/T_2$ equals $b/a$ exists.

A cover 22 is mounted on the casing 2 over the opening of the recess, or bore, 16, and a tension adjusting rod 23 is fixedly engaged with a center hole therein. The adjusting rod 23 is threaded at one end through a spring bracket, or collar 25, disposed within the recess 16 and having projections 26 disposed 180° apart thereon which are slidably received in the longitudinal slots 19 for keying the bracket in the recess 16. A handle 24 is fixed to the other end of the adjusting rod 23 outside the casing 2 for manually rotating, or turning, the adjusting bar 23 whereupon the spring bracket 25 is caused to move axially within the cylindrical recess 16. Another spring bracket, or collar 27, is fitted over the end of the supporting bar 20 opposite the end thereof which is engaged with the frame 13, and a coil spring 28 is compressed between it and the other spring bracket 25. Another cover plate 29 for an access opening in the sidewall of the casing 2 is illustrated in FIG. 2.

Operatively, therefore, by turning the handle 24, the spring bracket 25 is caused to move axially within the recess 16 so that the spring 28 either extends or is further compressed and effectively acts upon the supporting bar 20 for adjusting the position of the pulley shaft 12 relative to the casing 2, whereupon the tensions in the belts 10 and 11 are simultaneously adjusted.

Figure 3:
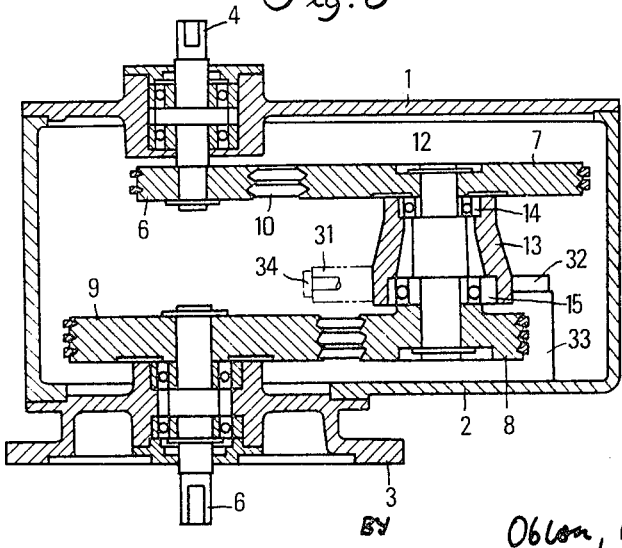
FIG. 3 is a side sectional view of another embodiment of this invention.
Figure 4:
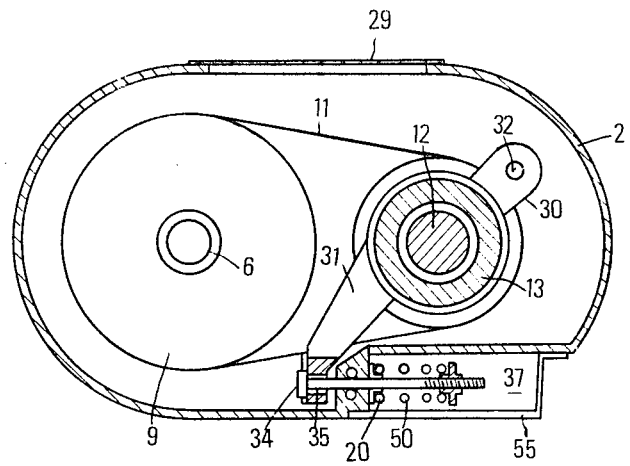
FIG. 4 is a longitudinal sectional view taken along the line 4—4 in FIG. 3.

Another embodiment of this invention is illustrated in FIGS. 3 and 4, wherein the device is shown being comprised of the same general power transfer arrangement illustrated in the embodiment of FIGS. 1 and 2, but is provided with a different, new and improved apparatus for varying the tension in the belts 10 and 11. More specifically, the tension adjusting apparatus comprises a pair of supporting arms, or links, 30 and 31, which are integrally attached to the supporting frame 13, the arm 30 of which is rotatably mounted on a pivot shaft 32 disposed in a support 33 provided in the casing structure 2. A supporting rod 34 is inserted through a hole 35 in the end of the other supporting arm 31 and passes through another hole 36 bored through the wall portion $2_a$ of the casing structure 2. The supporting rod 34 is connected at one end with an automatic tension adjusting mechanism 37 and has a flange portion on its other end for engaging the supporting arm 31 and causing the same to be normally urged in a belt tensioning direction as will be described hereinbelow.

Figure 5:
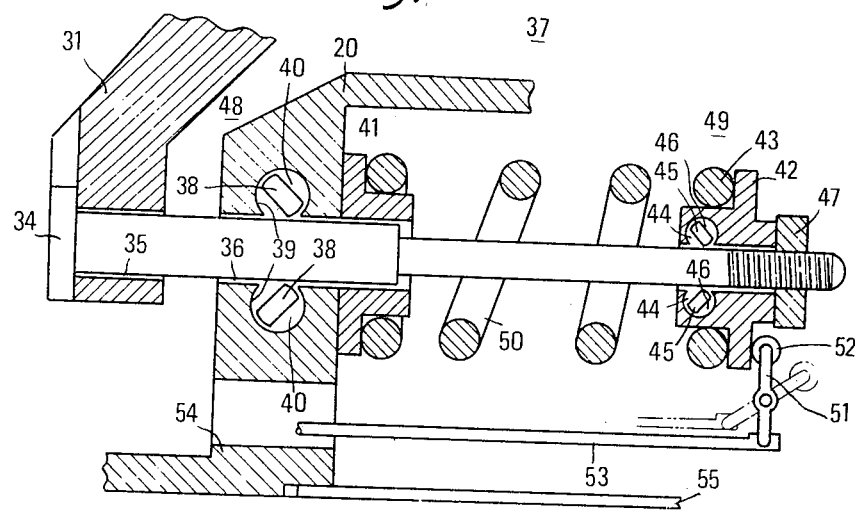
FIG. 5 is an enlarged sectional view of an automatic adjusting mechanism of this invention; and, FIG. 6 is a longitudinal sectional view of a further embodiment of this invention.

Referring now more particularly to FIG. 5, a pair of rotors 38 are disposed within a pair of recesses 39 in the wall $2_a$ of the casing 2, respectively, on opposite sides of the hole 36 and opening thereinto. A one-way clutch 48 for restricting movement of the supporting rod 34 through the hole 36 is provided by the rotors 38 and U-shaped leaf springs 40 associated therewith inside the recesses 39.

The supporting rod 34 extends through an opening in the spring bracket, or collar, 41, and another collar element, or spring bracket, 42, and is threadably engaged with a nut 47 disposed on the opposite side of the element 42 from the spring bracket 41. The element 42 is provided with a flange portion 43 and a pair of recesses 44 disposed on opposite sides of and communicating with the central bore therethrough, and a pair of rotors 45 are disposed within the recesses 44 with U-shaped leaf springs 46, whereby a one-way clutch 49 is formed. A coil spring 50 is disposed about the supporting rod 34 and is compressed between the spring bracket 41 and the flange 43 on element 42 for normally urging the supporting arm 31 and, consequently, the frame 13, in a belt-tightening direction. An adjuster link 51 rockably supported at the central portion thereof, as shown, has one end thereof in contacting relation with the flange 43 of element 42 through a roller 52 mounted thereon and is pivotally linked at its other end to a reciprocably moving rod 53 which passes through a hole 54 in the casing 2 and is pivotally mounted, for example, at an eccentric disposition of the pulley 9. A cover plate 55 is also shown for closing another access opening in the casing.

In the operational mode of the device illustrated in FIG. 5, tensioning of the belts 10 and 11 is normally provided by the drawing of the supporting rod 34 in a direction designated by an arrow A by the spring 50, which is allowed by the one-way clutch 48. Accordingly, if the belts 10 and 11 become extended due to certain causes or factors characteristically inherent therein, the spring 50 will extend to move the supporting rod 34, element 42 and nut 47 in the direction designated by the arrow A, thereby causing the supporting arm 31 and, consequently, the frame 13, to also move in the direction A for maintaining a predetermined tension in the belts 10 and 11. On the other hand, since the adjuster link 51 reciprocably moves back and forth in a certain period according to the rotation of the pulley 9, the element 42 may move in the direction designated by arrow B with respect to the supporting rod 34, the element 42 being depressed by the adjuster 51 to return to the position shown in FIG. 5. From these conditions, even if the adjuster 51 moves to the position designated by broken lines in FIG. 5, the movement of the element 42 in the direction shown by the arrow A with respect to the supporting rod 34 is prevented by the one-way clutch 49. Accordingly, even if the belts 10 and 11 are extended, for whatever reasons, the distance between the spring bracket 41 and the flange 43 of the element 42, or the tension in the belts 10 and 11, are maintained at predetermined set values by the action of the spring 50.

Figure 6:
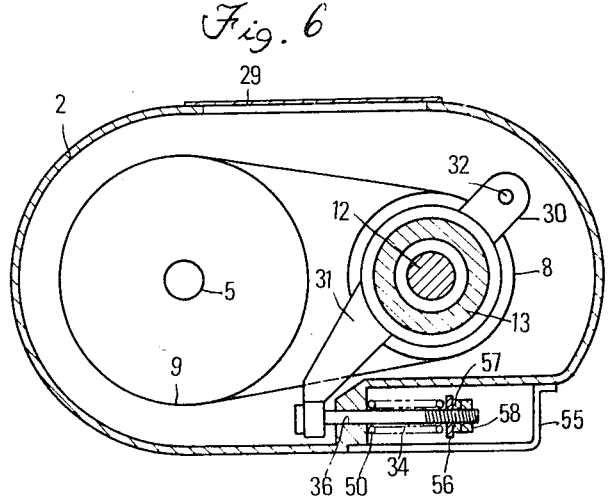

Referring now to FIG. 6, wherein a further embodiment of the invention is illustrated, there is provided a device for manually adjusting the tension of the belts 10 and 11 which comprises in combination a spring bracket 56, an adjusting nut 57, and a stop nut 58, all disposed about the threaded end of the supporting rod 34. In all other aspects, the other construction of the belt powered transmission device illustrated in FIG. 6 is the same as that of the embodiment illustrated in FIGS. 3 and 4. Accordingly, further discussion of the details of this embodiment is deemed unnecessary.

Obviously many modifications and variations of the present invention are possible in light of the above teachings. It is therefore to be understood that within the scope of the appended claims, the invention may be practiced otherwise than as specifically described.

What is claimed is:

1. A belt-powered transmission device comprising a casing, a pair of pulleys respectively mounted on input and output shafts in said casing for rotation therewith, a pair of intermediate pulleys, each being engaged through a belt with a different one of said input and output pulleys, a pulley shaft on which said intermediate pulleys are mounted, a supporting frame for rotatably bearing said pulley shaft, means for supporting said supporting frame in said casing and permitting displacement of said supporting frame relative to said casing and to said input and output pulleys mounted therein, spring means disposed between said casing and said supporting frame for urging said supporting frame in a direction away from said input and output pulleys for tensioning said belts, and means for adjusting said spring means for varying the tension in said belts.

2. The device set forth in claim 1 wherein said frame supporting means comprises a bar movably disposed in said casing along a given line and secured at one end to said frame, and said spring means being a coil spring compressed between a flange on said bar and a releasably movable spring bracket disposed in said casing.

3. The device set forth in claim 2 further including means for moving said spring bracket in either direction along said given line for varying the tension in said spring and in said belts.

4. A belt-powered transmission device comprising a pair of intermediate pulleys each being engaged through a belt with another pulley, a pulley shaft on which said intermediate pulleys are mounted, a supporting frame for rotatably bearing said pulley shaft, a supporting bar for supporting said support frame on a casing and movably disposed on said casing in substantially a straight line path, an adjusting screw bar disposed on said casing on substantially the same axis as that of said supporting bar at a predetermined distance therefrom, a movable element engaged with said screw bar, means for preventing rotational movement of said movable element and permitting and movement thereof only in a longitudinal direction, a spring engaged with said supporting bar and said movable element for tensioning said belts, and means for actuating said adjusting screw bar for moving said movable element in said longitudinal direction.

5. A belt-powered transmission device comprising a pair of intermediate pulleys each engaged through a belt with another pulley, a pulley shaft on which said intermediate pulleys are mounted, a supporting frame for rotatably bearing said pulley shaft, means for supporting said supporting frame and permitting movement thereof relative to said another pulleys for tensioning said belts, a supporting bar movable in response to the displacement of said supporting frame, an element movably disposed on said supporting bar, a spring disposed between a stationary portion of a casing and said movable element for urging said supporting frame in a direction to give tension on said belts, a first one-way clutch for permitting movement of said supporting bar in one direction only with respect to said stationary portion, a second one-way clutch for permitting movement of said element in one direction only with respect to said supporting bar, a rockable rod engageable with said movable element, and a lever driven by one of said another pulleys for rocking said rockable rod.

6. The device set forth in claim 5 wherein said frame supporting means comprises a pair of arms integrally attached to said frame, one of said arms being pivotally mounted on said stationary portion, and the other of said arms being engaged with said supporting bar.